(12) United States Patent
Chou

(10) Patent No.: US 7,767,311 B2
(45) Date of Patent: *Aug. 3, 2010

(54) ADHESIVE COMPOSITIONS DERIVED FROM HIGHLY FUNCTIONALIZED ETHYLENE COPOLYMERS

(75) Inventor: Richard T. Chou, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 883 days.

This patent is subject to a terminal disclaimer.

(21) Appl. No.: 11/191,808

(22) Filed: Jul. 28, 2005

(65) Prior Publication Data

US 2006/0025527 A1 Feb. 2, 2006

Related U.S. Application Data

(60) Provisional application No. 60/592,213, filed on Jul. 29, 2004.

(51) Int. Cl.
  B32B 27/08 (2006.01)
  B32B 27/30 (2006.01)
  B32B 27/32 (2006.01)
  B32B 27/34 (2006.01)
  C08L 33/02 (2006.01)
  C08F 8/00 (2006.01)

(52) U.S. Cl. ............ 428/476.3; 428/475.8; 428/476.9; 428/516; 428/520; 428/522; 525/191; 525/221; 525/222; 525/239; 525/240; 525/241

(58) Field of Classification Search ............ 428/475.8, 428/476.3, 476.9, 516, 520, 522, 349, 355 EN, 428/355 AC; 525/191, 221, 222, 239, 240, 525/241
See application file for complete search history.

(56) References Cited

U.S. PATENT DOCUMENTS

| | | | |
|---|---|---|---|
| RE30,322 E | 7/1980 | Hammer et al. | |
| 4,351,931 A | 9/1982 | Armitage | |
| 4,552,819 A | 11/1985 | Hibino | |
| 4,861,676 A | 8/1989 | Lee | |
| 4,861,677 A | 8/1989 | Lee | |
| 5,114,658 A | 5/1992 | Katsaros | |
| 5,225,482 A | 7/1993 | Nakagawa et al. | |
| 5,234,986 A | 8/1993 | McBride | |
| 5,408,000 A | 4/1995 | Katsaros et al. | |
| 5,516,583 A | 5/1996 | Zhang et al. | |
| 5,859,137 A | 1/1999 | Chou | |
| 5,965,255 A | 10/1999 | Ichimura et al. | |
| 6,177,516 B1 | 1/2001 | Hudak | |
| 6,211,291 B1 | 4/2001 | Rolland et al. | |
| 6,465,107 B1 | 10/2002 | Kelly | |
| 6,528,550 B1 | 3/2003 | Hsu et al. | |
| 6,545,091 B1 | 4/2003 | Lee et al. | |
| 6,756,443 B2 | 6/2004 | Feinberg | |
| 7,199,188 B2 | 4/2007 | Chou | |
| 7,279,520 B2 * | 10/2007 | Hausmann et al. .......... 524/401 |
| 2005/0020762 A1 | 1/2005 | Chou et al. | |
| 2005/0187315 A1 | 8/2005 | Dean | |
| 2005/0228145 A1 | 10/2005 | Lacroix et al. | |
| 2006/0025527 A1 | 2/2006 | Chou | |
| 2006/0052511 A1 | 3/2006 | Fan et al. | |
| 2006/0148988 A1 | 7/2006 | Chou | |
| 2006/0160952 A1 | 7/2006 | Chou et al. | |
| 2007/0155904 A1 | 7/2007 | Chou | |
| 2007/0255007 A1 | 11/2007 | Dean | |
| 2008/0255303 A1 | 10/2008 | Chou | |
| 2009/0215928 A1 | 8/2009 | Chou et al. | |
| 2009/0274856 A1 | 11/2009 | Chou | |
| 2009/0298372 A1 | 12/2009 | Chou et al. | |
| 2010/0069562 A1 | 3/2010 | Dean | |

FOREIGN PATENT DOCUMENTS

| | | |
|---|---|---|
| EP | 0359426 B1 | 3/1990 |
| GB | 1157569 | 7/1969 |
| WO | WO 01/18141 A1 | 3/2001 |
| WO | WO 02/28974 A2 | 4/2002 |
| WO | 02/102898 A1 | 12/2002 |
| WO | WO 03/099930 A1 | 12/2003 |

OTHER PUBLICATIONS

International Search Report for PCT/US2005/026954 dated Mar. 1, 2006.
Richard T. Chou, U.S. Appl. No. 12/464,994, Miscible Blends of Ethylene Copolymers with Improved Temperature Resistance, filed May 13, 2009.
Richard T. Chou, U.S. Appl. No. 12/276,822, Laminated Articles Comprising a Sheet of a Blend of Ethylene Copolymers, filed Nov. 24, 2008.
David M. Dean, U.S. Patent Appl. No. 12/707,745, Process for Recycling Polyolefin Blend Composition Using an Ethylene Copolymer Compatibilizing Agent, filed Feb. 18, 2010.
David M. Dean, U.S. Patent Appl. No. 12/707,769, Process for Recycling Polyolefin Blend Composition Using an Ethylene Copolymer Compatibilizing Agent, filed Feb. 18, 2010.

* cited by examiner

*Primary Examiner*—D. S Nakarani

(57) ABSTRACT

Disclosed are adhesive compositions comprising nonfunctionalized base resins and functionalized ethylene copolymers such as ethylene/maleic anhydride (E/MAH) or ethylene/ethyl hydrogen maleate (E/MAME) copolymer, which are synthesized directly in a high pressure autoclave. These adhesive compositions can be applied as self-supporting films or can be co-extruded or extrusion coated onto a substrate. Also disclosed are multilayer structures, films, pipe coatings and building panels comprising these compositions.

30 Claims, No Drawings

ADHESIVE COMPOSITIONS DERIVED FROM HIGHLY FUNCTIONALIZED ETHYLENE COPOLYMERS

This application claims the benefit of U.S. Provisional Application No. 60/592,213, filed Jul. 29, 2004.

BACKGROUND OF THE INVENTION

1. Field of the Invention

This invention relates to adhesive compositions. This invention also relates to articles comprising adhesive compositions.

2. Description of the Related Art

Modified polymers that have been functionalized (typically by maleic anhydride grafting) with reactive groups are widely used as extrusion and lamination adhesives, particularly as adhesive layers in multilayer composite structures. Maleic anhydride-grafted polymers (often referred to as "maleated" polymers) are also commonly used in pipe coatings and building panels.

Maleic anhydride-grafted polymers include maleated polyethylene, maleated polypropylene, maleated styrene-ethylene-butene-styrene triblock copolymer, and maleated polybutadiene. Ethylene/alky acrylate/carbon monoxide terpolymers, ethylene/vinyl acetate copolymers ethylene propylene rubbers can also be modified by maleic anhydride grafting. An example of a maleic anhydride modified linear high density polyethylene is a product sold under the trademark Polybond® 3009 available from Crompton Corporation. Similar maleated polyolefins are sold under the trademark Fusabond® available from DuPont.

U.S. Pat. Nos. 5,516,583; 4,861,676; 4,861,677; 4,552,819 and 5,965,255 disclose adhesive compositions. U.S. Pat. No. 5,225,482, discloses an adhesive composition comprising an ethylene-vinyl acetate copolymer, a styrene polymer resin, a graft-modified polyethylene, a polystyrene elastomer and an ethylene-olefin copolymer. PCT Patent Publication WO01/18141 discloses an adhesive composition comprising polyolefin, a functional polyolefin, a polystyrenic composition, and an elastomer.

Conventional modified polyolefins sacrifice either bonding strength to the metal or to the polyolefin, or do not activate at low temperatures when bonding to metals or polyolefins. Furthermore, adhesive compositions that activate at low temperatures can be very soft and tacky materials such that the handling of these compositions as free films in thermal laminating processes can be problematic and can require very costly release films to prevent blocking. Also, adhesives can significantly lose their bond strength over time after they are put into service. This phenomenon is referred to as "age-down" in the industry.

The production and use of maleated polyolefins and other maleic anhydride-grafted copolymers is not trouble-free. For example, it can be difficult to reach a high level of functionalization in a maleated polyolefin by grafting because the required reaction conditions can cause undesirable side reactions, such as crosslinking and chain scission. For this reason, grafting of maleic anhydride at a concentration of greater than about two weight % can be difficult and troublesome.

It can be desirable to use adhesive compositions that do not have the problems associated with high levels of grafting in maleated polyolefins yet provide superior adhesive performance.

Ethylene copolymers that include reactive functional groups such as maleic anhydride can be readily obtained by direct copolymerization using a high-pressure free radical process. Such a high-pressure is described, for example, in U.S. Pat. No. 4,351,931.

PCT patent Application publication WO2003/099930 A1 describes polyamides toughened by an impact modifier composition comprising a copolymer prepared from ethylene and a functional comonomer, wherein the functional comonomer is included in the range of from about 3 to about 15 weight % in the copolymer.

SUMMARY OF THE INVENTION

In one aspect, the present invention is an improved adhesive blended composition comprising olefin/maleate copolymers obtained from a high-pressure autoclave reactor blended with nonfunctionalized base resins.

In another aspect, the present invention is a polymeric adhesive composition comprising:

(a) a copolymer of an olefin and from about 3 weight % to about 15 weight % of a functional comonomer; and (b) a polymeric base resin;

wherein the adhesive composition comprises from about 5 to about 50 weight % of component (a) and from about 50 to about 95 weight % of component (b).

In another aspect, the present invention is an adhesive film comprising (a) a copolymer of an olefin and from about 3 weight % to about 15 weight % of a functional comonomer; and (b) a polymeric base resin;

wherein the adhesive composition comprises from about 5 to about 50 weight % of component (a) and from about 50 to about 95 weight % of component (b).

In still another aspect, the present invention is a multilayer composite structure comprising (a) a copolymer of an olefin and from about 3 weight % to about 15 weight % of a functional comonomer; and (b) a polymeric base resin;

wherein the adhesive composition comprises from about 5 to about 50 weight % of component (a) and from about 50 to about 95 weight % of component (b).

In still another aspect, the present invention is an article comprising (a) a copolymer of an olefin and from about 3 weight % to about 15 weight % of a functional comonomer; and (b) a polymeric base resin;

wherein the adhesive composition comprises from about 5 to about 50 weight % of component (a) and from about 50 to about 95 weight % of component (b).

DETAILED DESCRIPTION OF THE INVENTION

All references disclosed herein are incorporated by reference.

In one embodiment, the present invention is the present invention is an improved adhesive blended composition comprising olefin/maleate copolymers obtained from a high-pressure autoclave reactor blended with non-functionalized base resins.

The term "(meth)acrylic acid" means methacrylic acid and/or acrylic acid. Likewise, the term "(meth)acrylate" means methacrylate and/or acrylate.

For the purposes of the present invention, polyolefins are homopolymers and copolymers of olefin monomers. More specifically, homopolymers include polymers consisting of a single unsaturated olefin such as polyethylene, polypropylene, polybutene or the like where the olefin has from two to twenty carbon atoms. Copolymers of olefins include polymers consisting of one or more unsaturated or multiply unsaturated hydrocarbons having from two to twenty carbon atoms. Examples include, but are not limited to ethylene/propylene copolymers, ethylene/butene copolymers, ethylene/hexene copolymers, ethylene/octene copolymers, ethylene/styrene copolymers, ethylene/butene/octane copolymers, ethylene/propylene/norbornadiene copolymers and propylene/butene copolymers.

In this patent specification, the term "functional copolymer" refers to a copolymer of an olefin, particularly ethylene, with a comonomer that has specific functional groups capable of reacting to form covalent or ionic bonds.

The term "grafted polyolefin" refers to a polyolefin, to a non-olefin copolymer or to a mixture or blend of polyolefins and/or non-olefin copolymers, onto which is grafted at least one monomer selected from ethylenically unsaturated carboxylic acids and ethylenically unsaturated carboxylic acid anhydrides, including less preferably, derivatives of such acids, and mixtures thereof. Examples of the acids and anhydrides, which may be mono-, di- or polycarboxylic acids are acrylic acid, methacrylic acid, maleic acid, fumaric acid, itaconic acid, crotonic acid, itaconic anhydride, maleic anhydride and substituted maleic anhydride, e.g. dimethyl maleic anhydride or citrotonic anhydride, nadic (5-norbornene-2,3-dicarboxylic) anhydride, methyl nadic (methyl 5-norbornene-2,3-dicarboxylic) anhydride, and tetrahydrophthalic anhydride, maleic anhydride being particularly preferred. Examples of the derivatives of the unsaturated acids are salts, amides, imides and esters, e.g., mono- and disodium maleate, acrylamide, glycidyl methacrylate and dimethyl fumarate. Grafted polyolefins are well known in the art and can be produced by a variety of processes including thermal grafting in an extruder or other mixing device, grafting in solution or grafting in a fluidized bed reactor. Blends or mixtures of grafted polyolefins may also be used.

In this patent specification, the terms "polystyrenic" or "polystyrene" refers to homopolymers of styrene or alpha methylstyrene or copolymers of styrene with unsaturated monomers such as, but not limited to ethylene, butene, butadiene, or isoprene. Specific examples include, but are not limited to ethylene/styrene random or block copolymers, ethylene/butadiene random or block copolymers and hydrogenated and partially hydrogenated butadiene/styrene copolymers. Also useful are polystyrenics further modified for enhanced impact properties and usually referred to as High Impact Polystyrene or HIPS. Blends and mixtures of polystyrenics may also be used. Specific examples include, but are not limited to, High Performance Stryrenics sold by Nova Chemicals and ethylene/styrene copolymers sold by Dow Chemical under the name Index™.

In this patent specification, the term "elastomer" also refers to a polyolefin or polystyrenic but is distinguished from polyolefin or polystyrenic as described above in having a relatively low level of crystallinity, that is, in being relatively amorphous. Elastomers by definition herein will have a heat a fusion, as measured by differential scanning calorimetry (DSC), at 10 degrees centigrade per minute heating rate, of less than 30 joules/gram. A polyolefin elastomer, for example, may be a copolymer of ethylene and an alpha olefin and would include low density metallocene ethylene/butene copolymers sold by ExxonMobil under the name "Exact®" or metallocene ethylene/octene copolymers sold by DuPont Dow Elastomers under the name "Engage®". Polyolefin elastomers also include ethylene/propylene copolymers sold by ExxonMobil under the name "Vistalon®", ethylene/alpha olefin copolymer sold by Mitsui under the name "Tafmer®" or ethylene/propylene/norbornadiene copolymers sold by DuPont Dow Elastomers under the name of "Nordel®". Polyolefin elastomers also include polybutene rubber, polyisobutylene. Examples of polystyrenic elastomers would include, for example, di-block and tri-block copolymers sold by Shell under the name "Kraton®" or those sold by Firestone under the name "Stereon®".

Each component of the adhesive compositions of the present invention preferably provides certain attributes to the final adhesive. The low melting point base resin, such as polyethylene or ethylene/vinyl acetate copolymer, enhances the low activation temperature property of the adhesive. The functional copolymer mainly contributes to the superior bonding of the adhesive composition to substrates (for example, to more polar polymers such as polyamides or to metal).

Functional Copolymers

The adhesive compositions of this invention comprise a copolymer prepared from an olefin and a functional comonomer, more particularly a copolymer of an olefin, especially ethylene, and maleic anhydride, or its functional equivalent.

As used herein, the term "olefin/maleate copolymers" refers to copolymers prepared from an olefin and a functional comonomer such as maleic anhydride or maleic anhydride functional equivalents. Such equivalents include derivatives of maleic anhydride such as maleic acid and/or salts thereof, maleic acid diesters, maleic acid monoesters, itaconic acid, fumaric acid, fumaric acid monoester, or mixtures of any of these. Olefin/maleate copolymers also include E/X/Y terpolymers, wherein: E is ethylene; X is a monomer selected from the group consisting of vinyl acetate, (meth)acrylic acid, and/or derivatives thereof; and Y is maleic anhydride or its functional equivalent. Examples of monomers suitable for inclusion as component X are (meth)acrylic acid derivatives including acids, salts, esters, anhydrides, or other acid derivatives that are known to one of ordinary skill in the chemical arts. Methyl acrylate and butyl acrylate are particular examples of acrylate monomers suitable for inclusion as component X. Suitable as Y components are maleic anhydride, maleic diesters or monoesters (maleic half-esters) including esters of $C_1$-$C_4$ alcohols, such as, for example, methyl, ethyl, n-propyl, isopropyl, and n-butyl alcohols. Preferably the olefin/maleate copolymer includes maleic anhydride, maleic acid diesters, and/or maleic acid half-esters. More preferably the olefin/maleate copolymer includes maleic anhydride. Also more preferably the olefin/maleate copolymer includes maleic acid half-esters.

Olefin/maleate copolymers useful herein are obtained by a high-pressure free radical polymerization process. A high-pressure process suitable for use in the practice of the present invention is described, for example, in U.S. Pat. No. 4,351,931, the teachings therein incorporated herein by reference.

Polymer Base Resins

The adhesive composition comprises as a second component a thermoplastic polymer base resin. The polymers used in the composition are polymers that include, but are not limited to, polyolefins such as, for example, high density polyethylene (HDPE), low density polyethylene (LDPE), linear low density polyethylene (LLDPE), ultrahigh molecular weight polyethylene (UHMWPE), ultra low density polyethylene (ULDPE), metallocene polyethylenes—or MPE—(copolymers of ethylene and an alpha-olefin monomer obtained using a metallocene catalyst), ethylene/propylene copolymers, terpolymers such as ethylene/propylene/diene monomer (EPDM), and polypropylene homo- and copolymers.

Suitable base resins may also include ethylene copolymers obtained from copolymerization of ethylene with a polar monomer. Such suitable copolymers include ethylene vinyl acetate copolymers (EVA's) and ethylene (meth)acrylate copolymers. Ethylene (meth)acrylate copolymers include ethylene acrylic acid copolymers, ethylene methacrylic acid copolymers, salts derivable from ethylene acrylic and/or methacrylic acid copolymers, ethylene acrylic ester copolymers, ethylene methacrylic ester copolymers, and/or mixtures of any of these.

Suitable base resins may also include polyvinyl chloride, chlorinated polyvinyl chloride and polystyrene.

Combinations of two or more polymers may also be used.

For bonding two polymeric materials together (e.g., LDPE bonded to polyamides (nylons) such as nylon 6) polymers selected the group consisting of high density polyethylene, low density polyethylene, linear low density polyethylene, ultrahigh molecular weight polyethylene, ultra low density polyethylene, a copolymer of ethylene and alpha-olefin monomer using a metallocene catalyst (metallocene polyethylenes), ethylene/propylene copolymers, terpolymers such as ethylene/propylene/diene monomer, and polypropylene homo- and copolymers are of note. More preferably, the base resin is MPE, LDPE or LLDPE. LDPE is of particular note.

Without being held to theory, MPE is also of particular note in the practice of the present invention because of its substantially linear structure and narrow molecular weight distribution of the PE. MPE technology is capable of making lower density PE with high flexibility and low crystallinity, which can be desirable as the base resin component of this invention.

MPE technology is described in, for example, U.S. Pat. No. 5,272,236; U.S. Pat. No. 5,278,272, U.S. Pat. No. 5,507,475, U.S. Pat. No. 5,264,405, and U.S. Pat. No. 5,240,894.

For bonding to metal substrates such as aluminum foil, the second component base resin is preferably selected from the group consisting of MPE, copolymers of ethylene and vinyl acetate or copolymers of ethylene and alkyl acrylates.

The term "ethylene/alkyl acrylate copolymers" includes copolymers of ethylene and alkyl acrylates wherein the alkyl moiety contains from one to six carbon atoms. Examples of alkyl acrylates include methyl acrylate, ethyl acrylate and butyl acrylate. "Ethylene/methyl acrylate (abbreviated EMA)" means a copolymer of ethylene (abbreviated E) and methyl acrylate (abbreviated MA). "Ethylene/ethyl acrylate (abbreviated EEA)" means a copolymer of ethylene (abbreviated E) and ethyl acrylate (abbreviated EA). "Ethylene/butyl acrylate (abbreviated EBA)" means a copolymer of ethylene (abbreviated E) and butylacrylate (abbreviated BA). Of note are ethylene/butyl acrylate copolymers prepared from i-butyl acrylate comonomers (EiBA) and ethylene/butyl acrylate copolymers prepared from n-butyl acrylate comonomers (EnBA).

The relative amount of the alkyl acrylate comonomer incorporated into ethylene/alkyl acrylate copolymer can, in principle, vary broadly from a few weight percent up to as high as 40 weight percent of the total copolymer or even higher. Similarly, the choice of the alkyl group can, again in principle, vary from a simple methyl group up to a six-carbon atom alkyl group with or without significant branching. The relative amount and choice of the alkyl group present in the alkyl acrylate ester comonomer can be viewed as establishing how and to what degree the resulting ethylene copolymer is to be viewed as a polar polymeric constituent in the thermoplastic composition.

Preferably, the alkyl group in the alkyl acrylate comonomer has from one to four carbon atoms and the alkyl acrylate comonomer has a concentration range of from 5 to 30 weight percent of the ethylene/alkyl acrylate copolymer, preferably from 10 to 25 weight %.

Ethylene/alkyl acrylate copolymers can be prepared by processes well known in the polymer art using either autoclave or tubular reactors. The copolymerization can be run as a continuous process in an autoclave: ethylene, the alkyl acrylate, and optionally a solvent such as methanol (see U.S. Pat. No. 5,028,674) are fed continuously into a stirred autoclave of the type disclosed in U.S. Pat. No. 2,897,183, together with an initiator. The rate of addition will depend on variables such as the polymerization temperature, pressure, alkyl acrylate monomer employed, and concentration of the monomer in the reaction mixture needed to achieve the target composition of the copolymer. In some cases, it may be desirable to use a telogen such as propane, to control the molecular weight. The reaction mixture is continuously removed from the autoclave. After the reaction mixture leaves the reaction vessel, the copolymer is separated from the unreacted monomers and solvent (if solvent was used) by conventional means, e.g., vaporizing the nonpolymerized materials and solvent under reduced pressure and at an elevated temperature.

Tubular reactor produced ethylene/alkyl acrylate copolymer can be distinguished from the more conventional autoclave produced ethylene/alkyl acrylate as generally known in the art. Thus the term or phrase "tubular reactor produced" ethylene/alkyl acrylate copolymer, for purposes of this invention, denotes an ethylene copolymer produced at high pressure and elevated temperature in a tubular reactor or the like, wherein the inherent consequences of dissimilar reaction kinetics for the respective ethylene and alkyl acrylate comonomers is alleviated or partially compensated by the intentional introduction of the monomers along the reaction flow path within the tubular reactor. As generally recognized in the art, such a tubular reactor copolymerization technique will produce a copolymer having a greater relative degree of heterogeneity along the polymer backbone (a more blocky distribution of comonomers), will tend to reduce the presence of long chain branching and will produce a copolymer characterized by a higher melting point than one produced at the same comonomer ratio in a high pressure stirred autoclave reactor. Tubular reactor produced ethylene/alkyl acrylate copolymers are generally stiffer and more elastic than autoclave produced ethylene/alkyl acrylate copolymers.

Tubular reactor produced ethylene/alkyl acrylate copolymers of this nature are commercially available from E. I. du Pont de Nemours & Co., Wilmington, Del.

The actual manufacturing of the tubular reactor ethylene/alkyl acrylate copolymers as previously stated is preferably in a high pressure, tubular reactor at elevated temperature with additional introduction of reactant comonomer along the tube and not merely manufactured in a stirred high-temperature and high-pressure autoclave type reactor. However, it should be appreciated that similar ethylene/alkyl acrylate copolymeric material can be produced in a series of autoclave reactors wherein comonomer replacement is achieved by multiple zone introduction of reactant comonomer as taught in U.S. Pat. Nos. 3,350,372; 3,756,996; and 5,532,066, and as such these high melting point materials should be considered equivalent for purposes of this invention.

To further illustrate and characterize the tubular reactor produced ethylene/alkyl acrylate copolymer relative to conventional autoclave produced copolymer, the following list of commercially available ethylene/methyl acrylate copolymers with associated melting point data show that tubular EMA resins have considerably higher melting points versus autoclave EMA's due to a very different MA distribution along polymer chains:

| Autoclave produced copolymers | |
|---|---|
| EMA-A1 (21.5 wt % MA) | mp = 76° C. |
| EMA-A2 (24 wt % MA) | mp = 69° C. |
| EMA-A3 (20 wt % MA) | mp = 80° C. |
| EMA-A4 (24 wt % MA) | mp = 73° C. |
| Tubular reactor produced copolymers | |
| EMA-T1 (25 wt % MA) | mp = 88° C. |
| EMA-T2 (20 wt % MA) | mp = 95° C. |

For additional discussion regarding the differences between tubular reactor produced and autoclave produced ethylene/alkyl acrylate copolymers, see Richard T. Chou, Mimi Y. Keating and Lester J. Hughes, "High Flexibility EMA made from High Pressure Tubular Process", Annual Technical Conference—Society of Plastics Engineers (2002), 60th(Vol. 2), 1832-1836. CODEN: ACPED4 ISSN: 0272-5223; AN 2002:572809; CAPLUS.

Ethylene/alkyl acrylate copolymers suitable for use in this invention are available from DuPont. See Table A for specific examples of tubular reactor produced ethylene/alkyl acrylate copolymers available from DuPont.

TABLE A

| Ethylene Alkyl Acrylate Copolymer | Alkyl acrylate wt % | Melt Flow (g/10 min) |
|---|---|---|
| EMA-1 | 25 | 0.4 |
| EMA-2 | 25 | 0.6 |
| EMA-3 | 9 | 2 |
| EMA-4 | 14 | 2 |
| EMA-5 | 18 | 2 |
| EMA-6 | 24 | 2 |
| EMA-7 | 9 | 6 |
| EMA-8 | 20 | 8 |
| EMA-9 | 13 | 9 |
| EEA-1 | 12 | 1 |
| EEA-2 | 16 | 1 |
| EEA-3 | 15 | 6 |
| EEA-4 | 15 | 7 |
| EBA-1 | 7 | 1.1 |
| EBA-2 | 7 | 1.1 |
| EBA-3 | 17 | 1.5 |
| EBA-4 | 17 | 1.8 |
| EBA-5 | 27 | 4.3 |
| EBA-6 | 17 | 7.4 |

The ethylene/alkyl acrylate copolymers useful in the present invention can vary significantly in molecular weight as witnessed by ethylene/alkyl acrylate copolymers having a melt index numerically in terms of a fraction up to about ten. Of note are EBA-5 and EBA-6, having MI's of 4.3 and 7.4 g/10 min, respectively. Also of note is EMA-3, having an MI of 2 g/10 min.

In a particularly preferred embodiment, where an ethylene/alkyl acrylate copolymer is included in the base resin, the ethylene/alkyl acrylate copolymer is of the type that is prepared in a tubular reactor.

The compositions of this invention can be prepared by mixing the components together. Either dry blending or melt blending is used effectively to prepare the compositions as extrusion and lamination adhesives.

The compositions of the present invention can additionally comprise small amounts of optional materials commonly used and well known in the adhesive art. Such materials include conventional additives used in polymeric materials including plasticizers, stabilizers including viscosity stabilizers and hydrolytic stabilizers, primary and secondary antioxidants, ultraviolet ray absorbers, anti-static agents, dyes, pigments or other coloring agents, inorganic fillers, fire-retardants, lubricants, reinforcing agents such as glass fiber and flakes, foaming or blowing agents, processing aids, slip additives, antiblock agents such as silica or talc, release agents, tackifying resins and/or mixtures thereof. These additives are described in the Kirk Othmer *Encyclopedia of Chemical Technology*.

These conventional ingredients may be present in the compositions used in this invention in quantities that are generally from 0.01 to 15 weight %, preferably from 0.01 to 10 weight %, so long as they do not detract from the basic and novel characteristics of the composition and do not significantly adversely affect the adhesive qualities of the composition (the weight percentages of such additives are not included in the total weight percentages of the composition as defined above in the Summary of the Invention). Typically, many such additives may be present in from 0.01 to 5 weight %.

The optional incorporation of such conventional ingredients into the compositions can be carried out by any known process. This incorporation can be carried out, for example, by dry blending, by extruding a mixture of the various constituents, by the conventional masterbatch technique, or the like.

The adhesive compositions of the present invention can be dry blended and subsequently melt blended in a twin-screw extruder and repelletized as is well known in the art. Subsequently, these melt-blended resins can be converted and applied by a variety of techniques and processes. For example, the adhesive can be converted into a film by cast or blown film die extrusion techniques and this adhesive film can be laminated to appropriate substrates such as metals or polyolefins. As an alternative, the adhesive composition can be coextruded with other polyolefins as a skin layer on either one or both surfaces of the polyolefin to produce a more economical adhesive film. As a further alternative, a coextruded film can be created incorporating polar barrier resins such as polyamides, ethylene vinyl alcohol copolymer (EVOH) or polyester using the adhesive compositions of the present invention to bond directly to the polar barrier material. These adhesive films can be laminated to various substrates by heat activating the adhesive film. Heat activation can be done by a variety of methods including, but not limited to, direct contact with a heated plate or roller, absorption of infrared energy, direct heating in an oven or activation through RF frequency or microwave radiation.

In another application for the adhesive compositions of the present invention, the adhesive can be directly coated onto a substrate in processes well known in the art, including, for example, extrusion lamination, extrusion coating, coextrusion lamination and coextrusion coating. The adhesive compositions of the present invention can be used to bond to polar barrier resins, such as EVOH, polyamide or polyester. Some of the adhesive compositions can also be used to bond to metals, such as steel, aluminum, copper and brass, and to polyolefins such as polyethylene, ethylene copolymers and polypropylene.

As indicated above, combinations of the copolymers of ethylene and maleic anhydride (or its types) made from a high-pressure, free-radical process and suitable nonfunctionalized ethylene-based polymers have been disclosed as polyamide impact modifiers. The highly functionalized ethylene copolymer, such as ethylene/ethyl hydrogen maleate (E/MAME), by itself, is not a good impact modifier. For rendering toughness as polymer modifiers, the companion ethylene-based polymer has to be a soft PE with a lower crystallinity and/or lower glass transition temperature (Tg). For example, a combination of LDPE (a relatively harder PE) and E/MAME would not provide good impact resistance for toughening polyamide.

By itself, however, E/MAME can serve as an adhesive resin in applications where high adhesion strength is needed. Moreover, for example, a combination of LDPE and E/MAME as described herein can serve as an excellent tie layer in making an extruded or laminated polyamide (nylon)/tie/PE composite structure.

Adhesive compositions of the present invention bond to both metal and polyolefins, activate at relatively lower temperatures and are easily handled as a free or coextruded film not requiring interleafing or a release paper. In addition, it has been found that these adhesive compositions may fail cohesively during peel tests. Cohesive failure is a desirable attribute in that it can be an indicator of high bond strength, so much so that the bond strength is greater than the cohesive strength of the adhesive.

Cohesive failure also provides a convenient visual test to assure that multi-layer constructions are properly bonded when other testing methods are not readily available. Finally there appears to be a strong correlation between the cohesive failure mode of the adhesive and the retention of bond strength after the product is put into service.

Accordingly, the present invention provides adhesive compositions that possess excellent bonding properties to metallic substrates and to a number of polymeric materials resulting in an adhesive layer with high peel strength. The present invention also allows for a relatively lower activation temperature to be used in the manufacture of articles such as building panels and pipe coatings.

The preferred resin and adhesive compositions of the present invention can be used in various kinds of applications and possess varying properties depending on the specific application. One application for certain preferred adhesives is in manufacturing building panels for the construction industry in which the panels are in the form of a composite structure comprising metal substrates such as aluminum or steel bonded to a polyolefin core such as polyethylene. As indicated above, for bonding a polymer such as polyethylene to metal, base resins selected from MPE, copolymers of ethylene and vinyl acetate or copolymers of ethylene and alkyl acrylates are preferred. These preferred adhesive compositions of the present invention are used to bond the metal substrates to the polyethylene core. In such an application, it is important for the adhesive layer to provide excellent adhesion of the polyolefin to the metal substrate. As well, it is desirable that the adhesive fail cohesively during application and should be relatively easy to formulate and use. It has been found that adhesive compositions of the present invention provide excellent adhesion to metallic substrates and to a number of polymeric materials. The adhesive compositions can be used as self-supporting films, making them easy to handle and process.

Because of their unique combination of high peel strength, low surface tack when processed into films and bonding at low temperature, the preferred adhesives of the present invention are useful in the manufacture of aluminum and steel building panels.

Steel pipes or tubing that are intended for underground installation must be protectively coated against corrosion. This is typically accomplished by coating a pipe with an adhesive coating or primer followed by a layer of plastic jacketing material in a two-step procedure. The primer frequently consists of a particulate epoxy thermo-setting powder that fuses to a heated pipe to which the powder is applied. The jacketing material often consists of high-density polyethylene.

A traditional method for protectively coating a length of pipe is to rotate and convey a heated pipe longitudinally through a booth in which are mounted an array of powder guns. The powder guns spray particulate primer material about the circumference of the pipe as it is advanced through the booth. Downstream of the booth is a spiral wrapping apparatus that winds jacketing material in screw thread fashion onto the rotating pipe as disclosed, for example, in U.S. Pat. No. 3,616,006.

There are several disadvantages associated with the above approach. First, the conveying system used to rotate and advance the pipe is expensive to construct and maintain. Second, particularly in connection with smaller diameter pipes, it is difficult to achieve a uniform coating of primer on the pipe and there is also a great deal of over-spray and hence wastage of primer material. Third, jacketing materials applied using a spiral method are subject to weak joints at the overlap and poor coverage of radial or longitudinal welding seams on the pipe. The disadvantages of spiral wrapping are greater where high-density polyethylene is applied as the outer jacketing material. Pipe that has been spiral-wrapped with jacketing material often exhibits relatively poor low temperature adhesion of the protective coating. Fourth, this approach can only be used in an industrial plant setting and cannot be used to renew the pipe coating of a pipe at the site of installation.

To overcome the above disadvantages, alternative methods for protectively coating pipe have been sought. For example, a presently preferred method of jacketing a pipe employs a "cross-head" extrusion technique, also known as a "straight-through" or "endo" process. This entails conveying a non-rotating pipe longitudinally through an annular nozzle or head of an extruder, the extruder being operable to extrude tubular coatings of adhesive film and jacketing material over the pipe as it passes through the extrusion head. However, it is still necessary to provide an apparatus for and method of coating a length of non-rotating pipe with primer material upstream of the cross-head extruder (see U.S. Pat. No. 6,589, 346).

It is desirable to eliminate the use of primers in either the spiral wrapping method or the cross-head extrusion method for pipe coatings. The compositions of this invention provide sufficient adhesion to metal to allow multilayer structures such as tubular coextruded films to be adhered to pipes without the need for primers. Accordingly, this invention provides a pipe coating comprising a composition of this invention.

While the invention has been particularly shown and described with reference to the preferred embodiments thereof, it will be understood by those skilled in the art that various changes in form and details may be made without departing from the spirit and scope of the invention.

The following Examples are merely illustrative, and are not to be construed as limiting the scope of the invention described and/or claimed herein.

EXAMPLES

Materials Used

M-1 is a polyethylene/maleic anhydride graft copolymer with melt index (MI) of 1.5 and density of 0.93 g/cc, available from DuPont as Fusabond® E MB226D.

F-1 is a polyethylene/ethyl maleic acid monoester copolymer (E/MAME 90.5/9.5 weight %) with MI of 30.

F-2 is a polyethylene/maleic anhydride copolymer (E/MAH 96/4 weight %) with MI of 80.

LDPE-1 is a low-density polyethylene, available from Equistar under the tradename NA940 with MI of 0.25 and density of 0.918 g/cc.

MPE-1 is a low-density ethylene/octane copolymer prepared using metallocene catalysis, available from DuPont Dow Elastomers under the tradename Engage®8180 with MI of 0.5 and density of 0.863 g/cc.

PA-1 is a Nylon 6, available from BASF under the tradename Ultramid® B35.

EBA-5 is an ethylene/n-butyl acrylate copolymer (27 weight % n-BA) with a MI of 4.3.

EMA-3 is an ethylene/methyl acrylate copolymer (9 weight % MA) with a MI of 2.

EVA-1 is an ethylene/vinyl acetate copolymer (21 weight % VA) with a MI of 1.5.

PP-1 is a polypropylene, available from Dow Chemical under the tradename DX5E98 with a MI of 3.4 and a density of 0.90 g/cc.

HIP-1 is a high impact styrene, available from Nova Chemicals under the tradename PX510 with MI of 3.4 and density of 0.90 g/cc.

All parts and percentages are given by weight unless otherwise indicated.

Melt index (MI) is the mass rate of flow of a polymer through a specified capillary under controlled conditions of temperature and pressure. Melt indices reported herein are determined according to ASTM 1238 at 190° C. using a 2160 g weight, with values of MI reported in grams/10 minutes.

Examples 1 through 3 in Table 1 show the adhesion achieved using compositions of this invention as a tie layer in 3-layer nylon/tie/LDPE blown films. Three-layer coextruded blown films of PA-1/tie/LDPE-1 (with thickness about 1.0 mil/0.5 mil/1.5 mil) were prepared on a blown film line using a 5 cm (2-inch) diameter Brampton die. The tie layer was a dry-blended mixture of LDPE-1 and F-1, with an F-1 content of 5, 10 and 20 wt %, respectively. One-inch wide strips were cut from the 3-layer films. The strips were tested for adhesion characteristics using hand peel tests on the second day.

All three 3-layer films show excellent interlayer adhesions that are inseparable between layers. Even with a level of 5 weight % of F-1, the composition provides excellent adhesion. This demonstrates that an adhesive composition of this invention may be prepared from a combination of E/MAME and a low-cost LDPE (or other PE), without melt blending, that provides high adhesion strength.

TABLE 1

Three-Layer Blow Films of LDPE-1/Tie/PA-1

| Example | Tie-Layer Composition (Dry Blended weight ratio) | Adhesion |
|---|---|---|
| 1 | LDPE-1/F-1 (95/5%) | Inseparable |
| 2 | LDPE-1/F-1 (90/10%) | Inseparable |
| 3 | LDPE-1/F-1 (80/20%) | Inseparable |

Examples 4 Through 8

Blown film samples of the compositions listed in Table 2, approximately 2 to 4 mils in thickness, were made using a small laboratory scale blown film line. The films were subsequently used as adhesive layers to make three-layer composites of the structure Al foil/adhesive/Al foil. The Al foil was 1 mil thick. The three-layer composites were prepared according to the following procedure:

The lamination press was set at a specified temperature. The composites were assembled by stacking in order: Al foil/adhesive (blown film)/Al foil. The stacked layers were preheated in the press for 5 minutes and then pressed for 30 seconds at 44 psi pressure to form the laminated composite structure. The structure was allowed to cool to room temperature. One-inch wide strips were cut from the 3-layer films. The strips were tested for adhesion characteristics using a hand peel test on the second day.

The data are summarized in Table 2. The peel tests were reported as follows:

a) N means no adhesion, i.e., the composite readily peeled open.

b) P means that there is adhesion, but the Al foil and adhesive layer can be separated without tearing apart the Al foil.

c) Y means that the adhesion strength is too strong to peel apart without rupturing the Al foil.

TABLE 2

Peel Test of Al/Adhesive/Al Laminates

| Example | Adhesive Tie-Layer Composition (Dry Blended weight ratio) | Peel Adhesion (44 psi/30 seconds) Lamination temperature | | | | | |
|---|---|---|---|---|---|---|---|
| | | 120° C. | 130° C. | 140° C. | 150° C. | 180° C. | 210° C. |
| 4 | LDPE-1/F-1(90/10%) | | | | N | | |
| 5 | LDPE-1/F-1(75/25%) | | | | N | | |
| 6 | LDPE-1/F-1(50/50%) | | | | N | | |
| 7 | LDPE-1/F-1(80/20%) | | | | | N | N |
| 8 | PP-1/F-1(60/40%) | | | | | N | N |
| C1 | F-1 | N | P | P | P | P | P |

As shown in Table 2, at the press molding condition specified, blends of E/MAME with either PP or LDPE (Examples 4 through 8) do not impart adequate adhesion to the Al foil. The Al foil and the blend adhesive peeled readily apart.

Pure E/MAME (Comparative Example C1) as a tie layer adheres to the Al oil. However, by hand peel, it is obvious that the adhesion between the Al oil and the E/MAME layer is not very strong. The composite is peeled open without rupturing the Al foil.

Examples 9 Through 44

Laminate samples of the compositions listed in Table 3 were prepared according to the procedures for Examples 4 through 8.

The peel strength was assessed using 90-degree Peel Strength tests were conducted according to ASTM 904 at a test speed of 50 mm/minute. The results are summarized in Table 3.

TABLE 3

Peel Test of Al/Adhesive/Al Laminates

| Example | Adhesive Composition | Lamination Conditions (Temperature/ Duration) | Peel Strength (grams/ inch) |
|---|---|---|---|
| C2 | F-1 | 110° C./20 sec | 766 |
| C3 | F-1 | 110° C./23 sec | 684 |
| C4 | F-1 | 120° C./20 sec | 1021 |
| C5 | F-1 | 130° C./20 sec | 1007 |
| C6 | F-1 | 140° C./20 sec | 1136 |
| 9 | EBA-5/F-1 (70/30%) | 100° C./20 sec | 532 |
| 10 | EBA-5/F-1 (70/30%) | 110° C./3 sec | 1454.5 |
| 11 | EBA-5/F-1 (70/30%) | 110° C./20 sec | 1754 |
| 12 | EBA-5/F-1 (70/30%) | 120° C./20 sec | 2164 |
| 13 | EBA-5/F-1 (70/30%) | 130° C./20 sec | 1223 |
| 14 | EBA-5/F-1 (70/30%) | 140° C./20 sec | 1596 |
| 15 | EVA-1/F-1 (80/20%) | 100° C./20 sec | 2005 |
| 16 | EVA-1/F-1 (80/20%) | 110° C./3 sec | 1943 |
| 17 | EVA-1/F-1 (80/20%) | 110° C./20 sec | 2000 |
| 18 | EVA-1/F-1 (80/20%) | 120° C./20 sec | 2512 |
| 19 | EVA-1/F-1 (80/20%) | 130° C./20 sec | 2630 |
| 20 | EVA-1/F-1 (80/20%) | 140° C./20 sec | 2724 |
| 21 | EMA-3/F-1 (70/30%) | 100° C./20 sec | 387 |
| 22 | EMA-3/F-1 (70/30%) | 110° C./3 sec | 1706 |
| 23 | EMA-3/F-1 (70/30%) | 110° C./20 sec | 1787 |
| 24 | EMA-3/F-1 (70/30%) | 120° C./20 sec | 1938 |
| 25 | EMA-3/F-1 (70/30%) | 130° C./20 sec | 2681 |
| 26 | EMA-3/F-1 (70/30%) | 140° C./20 sec | 2325 |
| 27 | MPE-1/F-1 (70/30%) | 100° C./20 sec | 1297 |
| 28 | MPE-1/F-1 (70/30%) | 110° C./3 sec | 2023 |
| 29 | MPE-1/F-1 (70/30%) | 110° C./20 sec | 1867 |
| 30 | MPE-1/F-1 (70/30%) | 120° C./20 sec | 2114 |
| 31 | MPE-1/F-1 (70/30%) | 130° C./20 sec | 2414 |
| 32 | MPE-1/F-1 (70/30%) | 140° C./20 sec | 2294 |
| 33 | EVA-1/F-2 (70/30%) | 100° C./20 sec | 1721 |
| 34 | EVA-1/F-2 (70/30%) | 110° C./3 sec | 2093 |
| 35 | EVA-1/F-2 (70/30%) | 110° C./20 sec | 1713 |
| 36 | EVA-1/F-2 (70/30%) | 120° C./20 sec | 2393 |
| 37 | EVA-1/F-2 (70/30%) | 130° C./20 sec | 2058 |
| 38 | EVA-1/F-2 (70/30%) | 140° C./20 sec | 3593 |
| 39 | EVA-1/F-2/HIP-1 (56/24/20%) | 100° C./20 sec | 1484 |
| 40 | EVA-1/F-2/HIP-1 (56/24/20%) | 110° C./3 sec | 2916 |
| 41 | EVA-1/F-2/HIP-1 (56/24/20%) | 110° C./20 sec | 2645 |
| 42 | EVA-1/F-2/HIP-1 (56/24/20%) | 120° C./20 sec | 3042 |
| 43 | EVA-1/F-2/HIP-1 (56/24/20%) | 130° C./20 sec | 2971 |
| 44 | EVA-1/F-2/HIP-1 (56/24/20%) | 140° C./20 sec | 3006 |

Pure E/MAME (Comparative Examples C2 through C6) as a tie layer adheres to the Al foil. However, adhesive strength is not sufficient for all applications.

Examples 4 through 44 demonstrate that combinations of E/MAME or E/MAH and soft ethylene copolymers, such as ethylene/vinyl acetates and ethylene/alkyl acrylates, and MPE provide unexpected excellent adhesion to metal.

The E/MAME blends with EVA-1, EBA-5 or EMA-3 all showed excellent adhesion to the Al foil. The composites could not be peeled open without tearing apart the Al foil. Thus, the adhesive failure is a cohesive failure. Also, the adhesion initiation temperature for the E/MAME blended with EVA is activated at a much lower temperature than that for the pure E/MAME.

Having thus described and exemplified the invention with a certain degree of particularity, it should be appreciated that the following claims are not to be so limited but are to be afforded a scope commensurate with the wording of each element of the claim and equivalents thereof.

What is claimed is:

1. A polymeric adhesive composition comprising:
   (a) a direct copolymer obtained by a high-pressure free radical polymerization process, said copolymer consisting essentially of i) a first comonomer that is an olefin; ii) from about 3 weight % to about 15 weight % of a second comonomer that is a functional comonomer selected from the group consisting of, maleic acid diesters, maleic acid monoesters, fumaric acid monoesters, and mixtures of two or more thereof; and iii) optionally, a third comonomer selected from the group consisting of vinyl acetate, esters of acrylic acids and esters of methacrylic acids; and
   (b) a polymeric base resin selected from the group consisting of copolymers of ethylene and an alpha-olefin, copolymers of propylene and alpha-olefin monomers other than ethylene, polypropylene homopolymers, ethylene vinyl acetate copolymers, ethylene acrylic acid copolymers, ethylene methacrylic acid copolymers, ethylene acrylic ester copolymers, ethylene methacrylic ester copolymers, salts of ethylene acrylic acid copolymers, salts of ethylene methacrylic acid copolymers, polyvinyl chloride, chlorinated polyvinyl chloride and polystyrene, and mixtures thereof, with the proviso that said base resin is not the same as said copolymer of component (a)
   wherein the adhesive composition comprises from about 5 to about 50 weight % of component (a) and from about 50 to about 95 weight % of component (b).

2. The composition of claim 1 wherein the functional comonomer is selected from the group consisting of maleic acid diesters, maleic acid monoesters, and mixtures of two or more thereof.

3. The composition of claim 2 wherein the functional comonomer is a maleic acid monoester.

4. The composition of claim 1 wherein the copolymer of component (a) is an E/X/Y terpolymer wherein E is ethylene; X is selected from the group consisting of vinyl acetate, acrylic acid esters, and methacrylic acid esters; and Y is selected from the group consisting of maleic acid diesters and maleic acid monoesters.

5. The composition of claim 4 wherein X is methyl acrylate or butyl acrylate.

6. The composition of claim 4 wherein the functional comonomer is a maleic acid monoester.

7. The composition of claim 1 wherein the polymeric base resin comprises at least one polyolefin polymer selected from the group consisting of linear low density polyethylenes, copolymers of ethylene and an alpha-olefin monomer prepared using a metallocene catalyst (metallocene polyethylenes), copolymers of ethylene and an alpha-olefin, copolymers of propylene and an alpha-olefin other than ethylene, terpolymers of ethylene, propylene and a diene monomer, and polypropylene homopolymers.

8. The composition of claim 1 wherein the polymeric base resin comprises at least one copolymer selected from the group consisting of ethylene vinyl acetate copolymers, ethylene acrylic ester copolymers, ethylene methacrylic ester copolymers, and mixtures of two or more thereof.

9. The composition of claim 1 wherein the base resin comprises at least two polymers, and at least one of said polymers is selected from the group consisting of polyvinyl chloride, chlorinated polyvinyl chloride and polystyrene.

10. The composition of claim 9 wherein at least one polymer is high impact polystyrene.

11. A film comprising an adhesive composition of claim 1.

12. A multilayer composite structure comprising an adhesive composition of claim 1.

13. The multilayer composite structure of claim 12 wherein the composite structure is a multilayer film or sheet.

14. The multilayer composite structure of claim 13 wherein the composite structure is a packaging film.

15. The multilayer structure of claim 14 wherein the structure comprises at least two adhesive layers.

16. The multilayer structure of claim 15 wherein the structure comprises at least three adhesive layers.

17. A pipe coating comprising an adhesive composition of claim 1.

18. The pipe coating of claim 17 wherein the functional comonomer is selected from the group consisting of maleic acid diesters, maleic acid monoesters, and mixtures thereof.

19. The pipe coating of claim 18 wherein the functional comonomer is a maleic acid monoester.

20. The pipe coating of claim 17 wherein the polymeric base resin comprises at least one ethylene copolymer selected from the group consisting of ethylene vinyl acetate copolymers, ethylene acrylic ester copolymers, ethylene methacrylic ester copolymers, and mixtures of two or more thereof.

21. An article comprising an adhesive composition of claim 1.

22. The article of claim 21 wherein the article is a pellet or a building panel.

23. The article of claim 22 wherein the functional comonomer is selected from the group consisting of maleic acid diesters, maleic acid monoesters, and mixtures of two or more thereof.

24. The article of claim 23 wherein the functional comonomer is a maleic acid monoester.

25. The article of claim 21 wherein the polymeric base resin comprises at least one ethylene copolymer selected from the group consisting of ethylene vinyl acetate copolymers, ethylene acrylic ester copolymers, ethylene methacrylic ester copolymers, and mixtures of two or more thereof.

26. A polymeric adhesive composition of claim 1 wherein the direct copolymer is a dipolymer and the olefin is ethylene.

27. A laminate comprising a polyamide layer and an adhesive layer in contact with said polyamide layer, wherein the adhesive layer comprises a polymeric adhesive composition comprising:
- (a) a direct copolymer obtained by a high-pressure free radical polymerization process, said copolymer consisting essentially of i) a first comonomer that is an olefin and ii) from about 3 weight % to about 15 weight % of a second comonomer that is a functional comonomer selected from the group consisting of maleic acid diesters, maleic acid monoesters, fumaric acid monoesters, and mixtures of two or more thereof; and
- (b) a polymeric base resin selected from the group consisting of polyethylene homopolymers, polypropylene homopolymers, copolymers of ethylene and an alpha-olefin, copolymers of propylene and alpha-olefin monomers other than ethylene, ethylene vinyl acetate copolymers, ethylene acrylic acid copolymers, ethylene methacrylic acid copolymers, ethylene acrylic ester copolymers, ethylene methacrylic ester copolymers, salts of ethylene acrylic acid copolymers, salts of ethylene methacrylic acid copolymers, polyvinyl chloride, chlorinated polyvinyl chloride and polystyrene, and mixtures thereof, with the proviso that said base resin is not the same as said copolymer of component (a)
- wherein the adhesive composition comprises from about 5 to about 50 weight % of component (a) and from about 50 to about 95 weight % of component (b).

28. A laminate of claim 27 wherein the adhesive composition comprises an ethylene homopolymer.

29. A laminate of claim 28 wherein the ethylene homopolymer is low density polyethylene.

30. A laminate of claim 27 wherein the functional comonomer is a maleic acid monoester.

* * * * *